United States Patent
Pan et al.

(10) Patent No.: US 9,696,071 B2
(45) Date of Patent: Jul. 4, 2017

(54) GAS-LIQUID SEPARATOR

(71) Applicant: Zhejiang Sanhua Climate and Appliance Controls Group Co., Ltd., Zhejiang (CN)

(72) Inventors: Yong Pan, Zhejiang (CN); Zhijun Zhang, Zhejiang (CN); Jiabo Xing, Zhejiang (CN); Feng Chen, Zhejiang (CN)

(73) Assignee: Zhejiang Sanhua Intelligent Controls Co., Ltd., Shaoxing, Zhejing (CN)

( * ) Notice: Subject to any disclaimer, the term of this patent is extended or adjusted under 35 U.S.C. 154(b) by 253 days.

(21) Appl. No.: 14/363,371

(22) PCT Filed: Jan. 24, 2013

(86) PCT No.: PCT/CN2013/070926
§ 371 (c)(1),
(2) Date: Jun. 6, 2014

(87) PCT Pub. No.: WO2013/120409
PCT Pub. Date: Aug. 22, 2013

(65) Prior Publication Data
US 2014/0352270 A1    Dec. 4, 2014

(30) Foreign Application Priority Data
Feb. 14, 2012 (CN) .......... 2012 1 0032480

(51) Int. Cl.
*B01D 45/08* (2006.01)
*F25B 43/00* (2006.01)
(Continued)

(52) U.S. Cl.
CPC .............. *F25B 43/00* (2013.01); *B01D 45/08* (2013.01); *B01D 45/12* (2013.01); *B01D 45/16* (2013.01);
(Continued)

(58) Field of Classification Search
CPC .... F25B 43/00; F25B 43/006; F25B 2400/23; B01D 45/08; B01D 45/12; B01D 45/16; Y10S 55/03; A47L 9/1683; B04C 5/103
See application file for complete search history.

(56) References Cited

U.S. PATENT DOCUMENTS 2,290,323 A * 7/1942 Graham ................ B01D 45/08
                                                    55/436
4,036,615 A * 7/1977 Heintzelman .......... B01D 53/26
                                                    55/442
(Continued)

FOREIGN PATENT DOCUMENTS

CN          1527009 A        9/2004
CN      200520102760         8/2006
(Continued)

OTHER PUBLICATIONS

International Search Report dated Apr. 25, 2013 from corresponding International Application No. PCT/CN2013/070926.
(Continued)

*Primary Examiner* — Dung H Bui
(74) *Attorney, Agent, or Firm* — Wolf, Greenfield & Sacks, P.C.

(57) ABSTRACT

A gas-liquid separator applicable to a refrigeration system includes a cylindrical body, an inlet pipe fixedly connected to an upper end of the cylindrical body and an outlet pipe fixedly connected to a lower end of the cylindrical body, and further includes a gas guiding element, the gas guiding element further including a baffle, a flange located at one end of the baffle, and a bottom plate located at the other end of the baffle, the baffle being located above the outlet pipe and blocking a gas inlet of the outlet pipe; the flange being fixedly connected to an inner wall of the cylindrical body;
(Continued)

and the bottom plate being fixedly connected to a side wall of a gas inlet end of the outlet pipe.

9 Claims, 6 Drawing Sheets

(51) Int. Cl.
*B01D 45/12* (2006.01)
*B01D 45/16* (2006.01)
*A47L 9/16* (2006.01)
*B04C 5/103* (2006.01)

(52) U.S. Cl.
CPC .......... *F25B 43/006* (2013.01); *A47L 9/1683* (2013.01); *B04C 5/103* (2013.01); *F25B 2400/23* (2013.01)

(56) References Cited

U.S. PATENT DOCUMENTS

| | | | | |
|---|---|---|---|---|
| 5,347,817 A * | 9/1994 | Kim | ................ | F25B 43/006 62/471 |
| 5,787,729 A * | 8/1998 | Wijaya | ................ | B01D 45/08 210/456 |
| 5,868,001 A * | 2/1999 | Shoulders | ................ | F04B 39/02 62/470 |
| 5,904,055 A | 5/1999 | Slais | | |
| 6,178,771 B1 * | 1/2001 | Yun | ................ | F04B 39/04 62/471 |
| 6,202,437 B1 * | 3/2001 | Yun | ................ | F04B 39/04 62/471 |
| 6,223,555 B1 * | 5/2001 | Schroeder | ................ | F25B 43/006 62/474 |
| 6,419,730 B1 * | 7/2002 | Chavez | ................ | B01D 45/08 55/430 |
| 7,682,412 B2 * | 3/2010 | Oh | ................ | A47L 9/1608 15/353 |
| 7,785,400 B1 * | 8/2010 | Worley | ................ | B01D 19/0042 55/423 |
| 2002/0189213 A1 * | 12/2002 | Neuschwander | ...... | B01D 45/08 55/385.3 |
| 2003/0079496 A1 | 5/2003 | Schroeder et al. | | |
| 2003/0079497 A1 | 5/2003 | Fisk et al. | | |
| 2003/0172963 A1 * | 9/2003 | Sugimoto | ................ | B01D 45/08 134/168 R |
| 2004/0093894 A1 * | 5/2004 | Kuhn | ................ | B01D 45/12 62/512 |
| 2004/0118148 A1 * | 6/2004 | Ther | ................ | F25B 43/006 62/503 |
| 2005/0060970 A1 * | 3/2005 | Polderman | ................ | B01D 45/08 55/320 |
| 2005/0279128 A1 * | 12/2005 | Otake | ................ | F25B 1/10 62/512 |
| 2006/0168995 A1 * | 8/2006 | Fralick | ................ | F25B 43/006 62/503 |
| 2007/0144207 A1 * | 6/2007 | Klotten | ................ | F25B 43/006 62/503 |
| 2008/0016887 A1 * | 1/2008 | Locke | ................ | F25B 43/006 62/117 |
| 2010/0132317 A1 * | 6/2010 | Thien | ................ | B01D 45/12 55/368 |
| 2010/0247305 A1 * | 9/2010 | Ewida | ................ | B01D 45/08 415/208.2 |
| 2011/0209446 A1 * | 9/2011 | Kayat | ................ | B01D 45/08 55/322 |
| 2011/0247497 A1 * | 10/2011 | Karvinen | ................ | B01D 45/08 95/272 |
| 2014/0033917 A1 * | 2/2014 | Rodgers | ................ | F23J 15/06 95/17 |

FOREIGN PATENT DOCUMENTS

| | | |
|---|---|---|
| CN | 101852522 A | 10/2010 |
| DE | 102006022024 A1 | 11/2007 |
| JP | 61197968 A | 9/1986 |
| JP | 62063666 U | 4/1987 |
| JP | 62131166 A | 6/1987 |
| JP | 2004279006 A | 10/2004 |

OTHER PUBLICATIONS

European Search Report from corresponding European Application No. 13 74 9277 dated Aug. 6, 2015.

* cited by examiner

GAS-LIQUID SEPARATOR

The present application is a National Stage application of PCT International Application No. PCT/CN2013/070926, filed on Jan. 24, 2013 which claims the priority of Chinese Patent Application No. 201210032480.0, titled "GAS-LIQUID SEPARATOR", filed with the Chinese State Intellectual Property Office on Feb. 14, 2012, both of which are incorporated herein by reference to the maximum extent allowable by law.

TECHNICAL FIELD

The present application relates to a gas-liquid separator, and particularly to a gas-liquid separator applied to a refrigerating system.

BACKGROUND

A gas-liquid separator is generally applicable to a refrigerating system, which is mounted between an evaporator and a compressor. The gas-liquid separator is mainly adapted to separate a gas-phase refrigerant from a liquid-phase refrigerant, and only the gas-phase refrigerant is absorbed into the compressor from a suction port thereof. Thus, a compressor slugging may be avoided. In addition, refrigerant oil is returned into the compressor to lubricate the compressor, so as to ensure a normal operation of the compressor and store a part of the liquid-phase refrigerant.

Referring to FIG. 1, a schematic view of a conventional structure of a gas-liquid separator is shown.

The gas-liquid separator generally includes a cylindrical body 105 with an inner chamber; an upper end cover 103 arranged above the cylindrical body 105 and fixedly connected with an inlet tube 101; and a lower end cover 104 arranged below the cylindrical body 105 and fixedly connected with an outlet tube 102. The upper end cover 103, the cylindrical body 105 and the lower end cover 104 constitute a closed inner chamber with a certain volume. It is required that no leakage and no-damage would happen when the inner chamber subjects a certain pressure. The outlet tube 102 is kept at a certain height in the inner chamber. The inlet tube 101 and the outlet tube 102 are coaxially arranged. A filter component 106 is further arranged between an inner side of the upper end cover 103 and the outlet tube 102. The gas-liquid separator may also have other structures. In a machine assembly, the outlet tube of the gas-liquid separator is kept vertically downwards, the inlet tube and the outlet tube are connected to tubes of the machine respectively, and the connected gas-liquid separator is located behind the evaporator and in front of the compressor.

Referring to FIGS. 2, 3 and 4, FIG. 2 is a schematic view of a structure of a filter component 106; FIG. 3 is a schematic top view of the filter component 106 shown in FIG. 2; and FIG. 4 is a schematic isometric view of the filter component 106 shown in FIG. 2. The filter component 106 mainly includes a filter screen 161 and a filter screen seat 162. Gas guide holes 163 are arranged on the filter screen seat 162. The filter screen 161 curves upwards to be in an arch shape. A center portion of the filter screen seat 162 also curves upwards to be in an arch shape. A diameter of the arch-shaped portion of the filter screen seat 162 is larger than a diameter of the outlet tube 102. The gas guide holes 163 are evenly arranged at a periphery of the arch-shaped area of the filter screen seat 162.

A lower end of the outlet tube 102 is welded to the lower end cover 104, the outlet tube 102 is fixed connected to the lower end cover 104 by only a welding portion, and the outlet tube 102 is kept at a certain height inside the inner chamber of the cylindrical body 105 so as to be in a suspension state. Therefore, in the welding process, the outlet tube 102 is apt to incline. In addition, since the welding portion has a small size and is unable to subject a large force, damage is apt to happen when in use. In patent CN200520102760, a positioning device for fixing the outlet tube 102 is additionally provided for solving this problem. The positioning device includes a positioning sleeve 201 and a supporting frame 202, as shown in FIG. 5.

In an operation process, a gas-liquid mixture enters into the inner chamber via the inlet tube 101. The gas, after entering into the inner chamber, passes through the filter screen 161, and passes through the gas guide holes 163 into the inner chamber of the cylindrical body 5 under the blocking of the filter screen seat 162. The liquid of the gas-liquid mixture falls towards the bottom of the inner chamber of the cylindrical body 5 because of the pull of gravity. The gas floats and enters into the outlet tube 102 under the influence of an external force, and enters into the compressor after being exported from the outlet tube 102, and small portion of liquid flows out through an oil return hole of the outlet tube 102.

Based on the above, the filter component in the gas-liquid separator has a relatively complicated structure, resulting in complicated assembling procedures and a high material cost. Therefore it is a technical problem to be solved presently by the skilled in the art to simplify the filter component, and reduce the manufacture cost of the gas-liquid separator.

SUMMARY

A gas-liquid separator is provided, which may be applied to a refrigerating system. A gas guide element of the gas-liquid separator has a simple structure, simple assembling procedures and a low material cost.

To solve the above technical problem, a gas-liquid separator is provided according to the application, which includes a cylindrical body, an inlet tube fixedly connected to an upper end of the cylindrical body, and an outlet tube fixedly connected to a lower end of the cylindrical body, and further includes a gas guide element. The gas guide element further includes a baffle, a flange located at an end of the baffle and a bottom plate located at the other end of the baffle, the baffle is located above the outlet tube and adapted to shield a gas inlet of the outlet tube; the flange is fixedly connected to an inner wall of the cylindrical body; and the bottom plate is fixedly connected to a side wall of a gas inlet end of the outlet tube.

Preferably, the gas guide element further includes vanes connected to both sides of the bottom plate respectively, and the vanes abut against the side wall of the gas inlet end of the outlet tube.

Preferably, the baffle is in a hemicycle shape, and the flange is located on an upper side of the baffle at a circular-arc end of the baffle, and the bottom plate is located on a lower side of the baffle at a straight line end of the baffle.

Preferably, the baffle is arranged to be inclined.

Preferably, the gas inlet end of the outlet tube is arranged to be an inclined plane facing the flange.

Preferably, a connecting surface is arranged at the side wall of the gas inlet end of the outlet tube, and the bottom plate is fixedly connected to the connecting surface by spot welding.

Preferably, the gas-liquid separator further includes a filter component, a through hole is provided at a side wall of a lower portion of the outlet tube, and the filter component is connected to the through hole.

Preferably, an annular-shaped step is provided at an outer wall of the lower portion of the outlet tube, and an annular-shaped surface of the annular-shaped step is fixedly connected to the cylindrical body.

Preferably, the outlet tube includes a first straight tube located inside the inner chamber of the cylindrical body, and a second straight tube located outside the lower end of the cylindrical body, and both the first straight tube and the second straight tube are fixedly connected to the cylindrical body.

Preferably, the cylindrical body further includes an upper end cover, a lower end cover and an intermediate body fixedly connected to the upper end cover and the lower end cover, the inlet tube is fixedly connected to the upper end cover, the outlet tube is fixedly connected to the lower end cover, and the flange of the gas guide element is fixedly connected to an inner wall of the intermediate body.

According to the present application, the filter component in the existing technology is replaced by a gas guide element including a baffle, a flange located at one end of the baffle and a bottom plate located at the other end of the baffle. The baffle is inclinedly arranged above the outlet tube, and shields a gas inlet of the outlet tube. The flange is fixedly connected to the inner wall of the cylindrical body. The bottom plate is fixedly connected to the side wall of the gas inlet end of the outlet tube. In an operation process, after entering from the inlet tube, a gas-liquid mixture firstly falls on the baffle under the blocking of the gas guide element, and falls into the inner chamber of the cylindrical body under the guiding of the baffle. Liquid of the gas-liquid mixture falls towards the bottom of the inner chamber of the cylindrical body from up to down because of the pull of gravity. Gas of the gas-liquid mixture enters into the outlet tube under the action of an external force, and is exported to enter into a compressor via the outlet tube. Because the baffle of the gas guide element is arranged to be inclined and shields the gas inlet of the outlet tube, the flow rate of the gas-liquid mixture can be reduced when the gas-liquid mixture flows off, which avoids the impacting of the liquid to the gas inlet of the outlet tube, therefore prevents the liquid from directly falling into the outlet tube, and separate the gas-liquid mixture effectively. Compared with the existing technologies, the gas guide element of the gas-liquid separator according to the present application may be made of a steel plate by simple manufacture procedures, which may not only separate the gas-liquid mixture effectively, and also reduce the manufacture cost. The gas guide element is fixedly connected to each of the cylinder body and the outlet tube, and also plays a role of fixing the outlet tube. Thus, the positioning device for positioning the outlet tube is avoided, and the manufacture cost is further reduced. The gas-liquid separator is particularly applicable to large and medium sized refrigerant system.

In a preferred embodiment, the baffle is in a hemicycle shape, the flange is arranged on an upper side of the baffle at a circular-arc end of the baffle, and the bottom plate is arranged a lower side of a straight line end of the baffle. The shape of the baffle matches with that of a cross section of the inner chamber of the cylindrical body. Thus, the scope protected by the baffle may extend and it may further be avoided to splash the liquid into the outlet tube during the falling of the liquid.

In another preferred embodiment, vanes are connected at both sides of the bottom plate respectively; two vanes abut against the side wall of the gas inlet end of the outlet tube.

Thus, the liquid rebounded by the inner wall of the cylinder body may be prevented from splashing into the outlet tube. Besides, before the gas guide element is fixedly connected to the outlet tube, a pre-fixing may be implemented by abutting the vanes of the gas guide element against the side wall of the gas inlet end of the outlet tube, thus simplifying the manufacture procedures.

DETAILED DESCRIPTION

A gas-liquid separator is provided, applied to a refrigerating system, according to the present application. A gas guide element of the gas-liquid separator has a simple structure, simple assembling procedures and a low material cost.

For those skilled in the art to better understand technical solutions of the present application, the present application is described in detail in conjunction with drawings and embodiments hereinafter.

The locality terms such as "upper" and "lower" involved herein are all defined taken the orientation of an outlet tube of the gas-liquid separator to be vertical downwards as a reference, it is to be appreciated that, the employment of the locality terms should not limit the scope of protection claimed in the present application.

Figure 1:
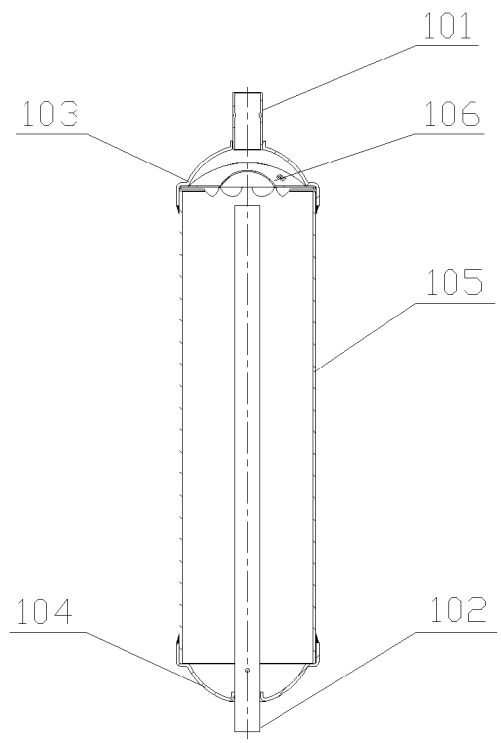
FIG. 1 is a schematic view of a conventional structure of a gas-liquid separator.
Figure 2:
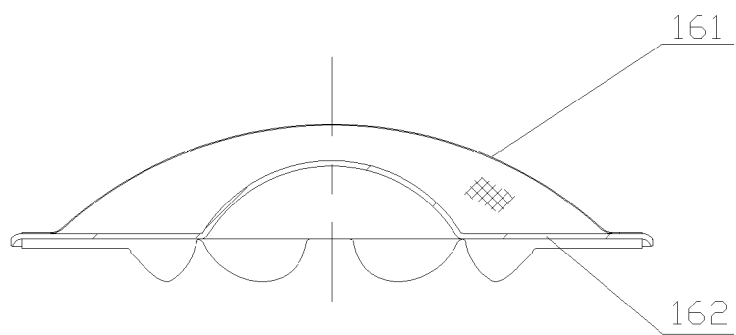
FIG. 2 is a schematic view showing a structure of a filter component in the gas-liquid separator shown in FIG. 1.
Figure 3:
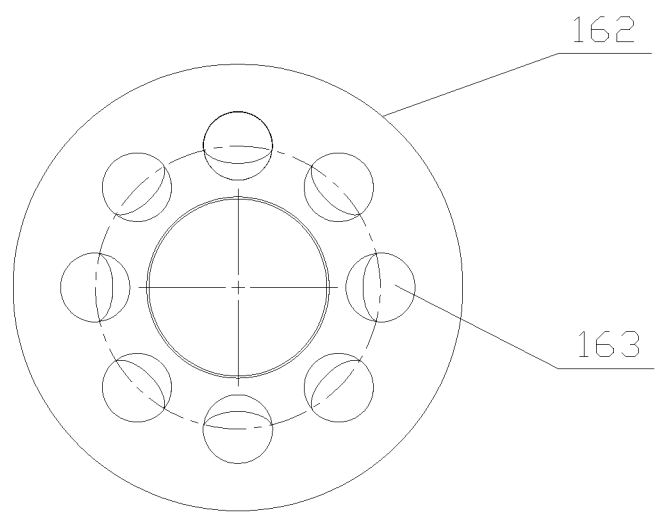
FIG. 3 is a schematic top view of the filter component shown in FIG. 2.
Figure 4:
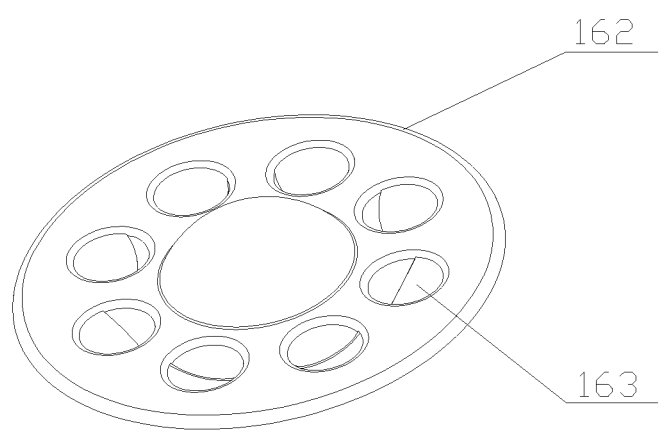
FIG. 4 is a schematic axonometric view of the filter component shown in FIG. 2.
Figure 5:
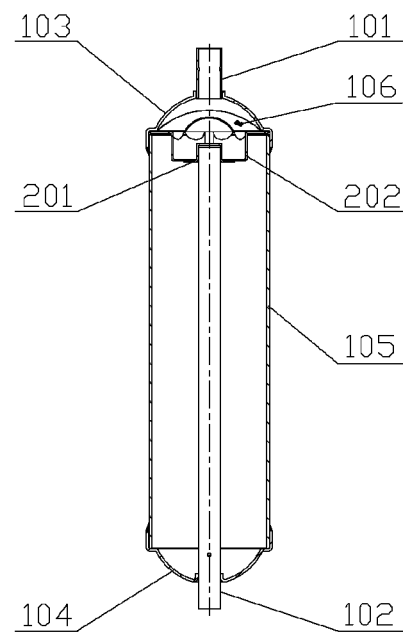
FIG. 5 is a schematic view of another conventional structure of a gas-liquid separator.
Figure 6:
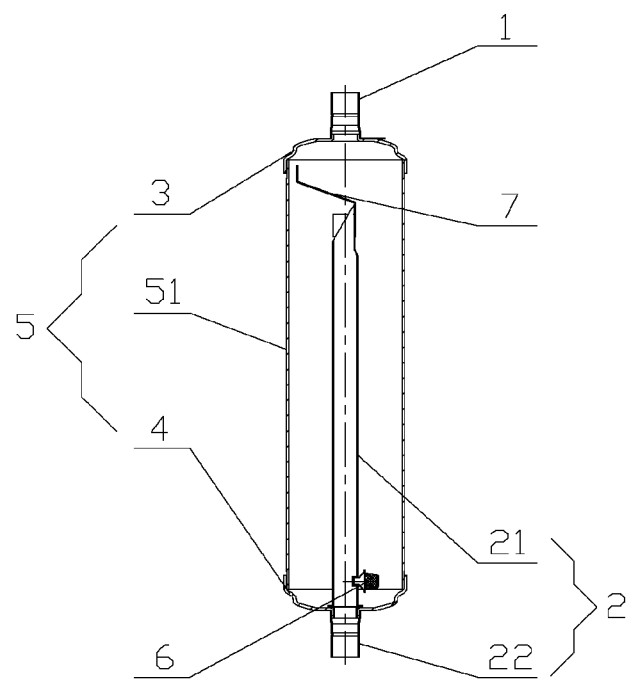
FIG. 6 is a schematic view showing a structure of a gas-liquid separator according to an embodiment of the present application.
Figure 7:
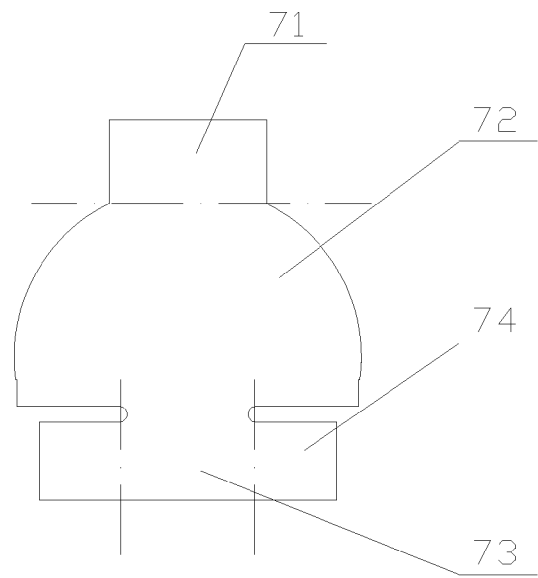
FIG. 7 is a schematic view showing a structure of a gas guide element according to an embodiment of the present application.
Figure 8:
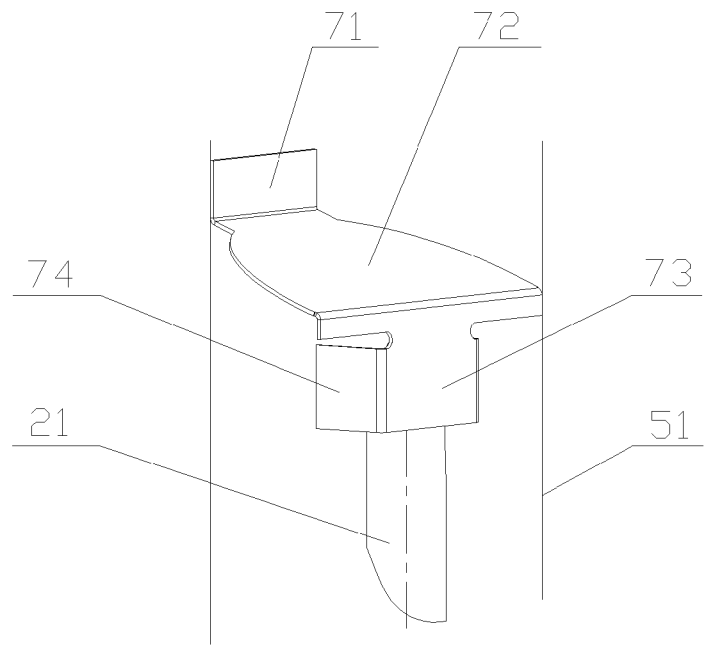
FIG. 8 is an assembly drawing of the gas guide element shown in FIG. 7.

Reference is made to FIGS. 6, 7 and 8. FIG. 6 is a schematic view showing a structure of a gas-liquid separator according to an embodiment of the present application; FIG. 7 is a schematic view showing a structure of a gas guide element according to an embodiment of the present application; and FIG. 8 is an assembly drawing of the gas guide element shown in FIG. 7.

In an embodiment, a gas-liquid separator according to the present application includes a cylindrical body 5. The cylindrical body 5 includes an intermediate body 51 in a cylinder shape, an upper end cover 3, and a lower end cover 4, where the upper end cover 3 and the lower end cover 4 are fixedly connected to both ends of the intermediate body 51 respectively. The upper end cover 3, the intermediate body 51 and the lower end cover 4 constitute a closed inner chamber with a certain volume. No leakage or damage would happen when the inner chamber subjects a certain pressure. Apparently, the gas-liquid separator may also have other structural forms.

The gas-liquid separator further includes an inlet tube 1 arranged above the cylindrical body 5. A lower end of the inlet tube 1 is fixedly connected to the upper end cover 3.

The gas-liquid separator further includes an outlet tube 2, and the outlet tube 2 is kept at a certain height inside the inner chamber of the cylindrical body 5. A lower end of the outlet tube 2 is fixedly connected to the lower end cover 4.

A gas guide element 7 is arranged above the outlet tube 2. The gas guide element 7 includes a baffle 72, a flange 71 arranged at an upper side of an end of the baffle 72 and a bottom plate 73 arranged at a lower side of the other end of the baffle 72. The baffle 72 is located above the outlet tube 2 and adapted to shield a gas inlet of the outlet tube 2. The flange 71 is fixedly connected to an inner wall of the intermediate body 51. The bottom plate 73 is connected to a side wall of a gas inlet end of the outlet tube 2. It is to be noted that, the "shielding" means that a projection of the baffle 72 on a horizontal plane contains the gas inlet of the outlet tube 2. In this way, a location relationship between the bottom plate 73 and the outlet tube 2 is also further ensured. As illustrated in FIG. 6, the outlet tube 2 is located between a plane on which the flange 71 is located and a plane on which the bottom plate 73 is located.

The baffle 72 may be arranged to be inclined. When entering into the inner chamber of the cylindrical body 5 via the inlet tube 1, a gas-liquid mixture falls off on the baffle 72. Thus, the baffle 72 not only serves as a guiding, but also reduces the flow rate of the gas-liquid mixture. In addition, since the baffle 72 shields the gas inlet of the outlet tube 2, it prevents the liquid from impacting the gas inlet of the outlet tube 2 directly; and effectively prevents the failure of the gas-liquid separation which results from the liquid entering into the outlet tube 2.

In addition, the baffle 72 may be configured in a hemicycle shape, which matches with the shape of the cross section of the inner chamber of the cylindrical body 5. In this way, the scope of protection is effectively extended, and the liquid is prevented from entering into the outlet tube 2. Here the flange 71 is arranged on an upper side of the baffle 72 at a circular-arc end of the baffle 72, and the bottom plate 73 is arranged on a lower side of the baffle 72 at a straight line end of the baffle 72. The baffle 72 may also be arranged to have other shapes, such as a trapezoid shape. In this case, the flange 71 is arranged on an upper side of the baffle 72 at the upper end of the baffle 72, and the bottom plate 73 is arranged on a lower side the baffle at the lower end of the baffle. In an arrangement, a connecting portion of the flange 71 connecting with the inner wall of the cylindrical body 5 is arranged to make a clearance between the edge of the baffle 72 and the inner wall of the cylindrical body 5 as small as possible, thus the scope protected by the baffle 72 may be extended as large as possible.

In addition, vanes 74 may be provided at both sides of the bottom plate 73, and two vanes 74 abut against the side wall of the gas inlet end of the outlet tube 2. In this way, before the gas guide element 7 is welded to the outlet tube 2, a pre-fixing may be implemented by abutting the vanes 74 of the gas guide element 7 against the side wall of the gas inlet end of the outlet tube 2. A further function of the vane 74 is that the vanes 74 may block the liquid rebounded by the inner wall of the cylindrical body 5 when the liquid falls off. Thus, the failure of the gas-liquid separation may be prevented, which results from the liquid entering into the outlet tube 2 directly.

In the process of a normal operation of the whole system, after entering into the inner chamber of the cylindrical body 5 via the inlet tube 1, a gas-liquid mixture firstly falls on the baffle 72 under the blocking of the gas guide element 7, and falls into the inner chamber of the cylindrical body 5 under the guiding of the baffle 72. Since the baffle 72 is arranged to be inclined, the flow rate of the gas-liquid mixture can be reduced. Liquid of the gas-liquid mixture falls towards the bottom of the inner chamber of the cylindrical body 5 from up to down because of the pull of gravity. Gas of the gas-liquid mixture enters into the outlet tube 2 under the action of an external force, and is exported to enter into a compressor via the outlet tube 2. The baffle 72 shields the gas inlet of the outlet tube 2, the shape of the baffle 72 matches with that of the cross section of the inner chamber of the cylindrical body 5, and also the bottom plate 73 and the vanes 74 closely abut against the outer wall of the gas inlet end of the outlet tube 2. Thus, it is effectively avoided to impact the gas inlet of the outlet tube 2 by the fell liquid and splash the liquid into the outlet tube 2. In addition, it is effectively avoided that the liquid rebounded by the inner wall of the cylindrical body 5 falls into the outlet tube 2, and the compressor slugging due to the fell liquid is further avoided.

The gas guide element 7 may be made of a steel plate by simple manufacture procedures and simple assembling procedures, and thus the gas guide element 7 has a low manufacture cost.

Compared with the filter component in the existing technology, the gas guide element 7 according to the present application may not only effectively separate the gas-liquid mixture, but also reduce the manufacture cost. Furthermore, the gas guide element 7 is fixedly connected with the cylindrical body 5 and the outlet tube 2, which is thus adapted to fix the outlet tube 2. Thus, the vibration of the outlet tube 2 during an operation as well as the noise due to the vibration is avoided. Therefore, the positioning device for positioning the outlet tube 2 may be removed, further reducing the manufacture cost.

Several improvements can be made to the gas guide element 7 and the outlet tube 2 described hereinbefore.

Figure 9:
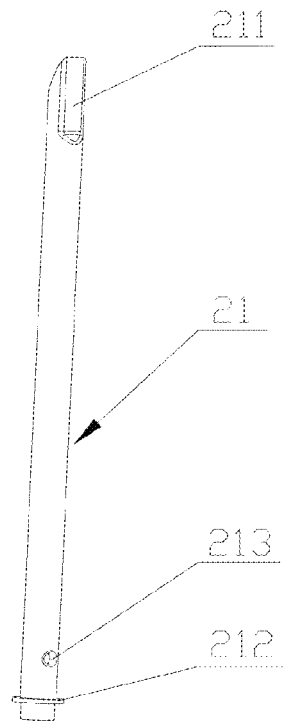
FIG. 9 is a schematic view showing a structure of a first straight tube according to an embodiment of the present application.
Figure 10:
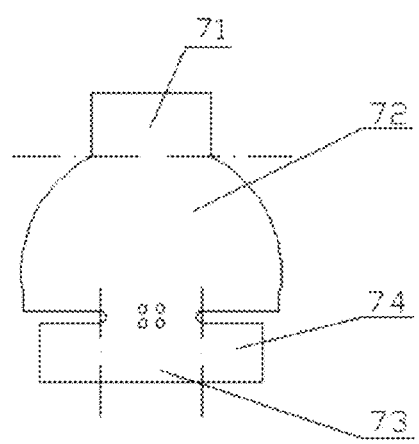
FIG. 10 is a schematic view showing a structure of a gas guide element according to another embodiment of the present application.
Figure 11:
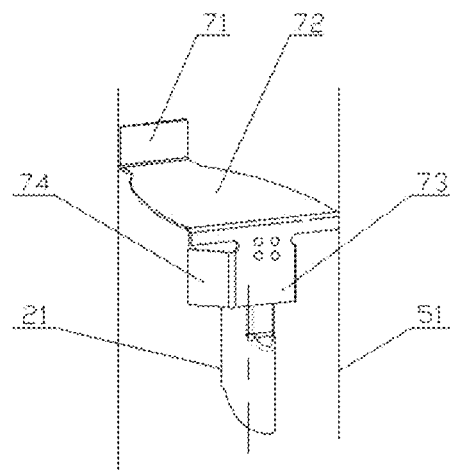
FIG. 11 is an assembly drawing of the gas guide element shown in FIG. 10.

Reference is made to FIGS. 9, 10 and 11. FIG. 9 is a schematic view showing a structure of an outlet tube according to an embodiment of the present application; FIG. 10 is a schematic view showing a structure of a gas guide element according to another embodiment of the present application; and FIG. 11 is an assembly drawing of the gas guide element shown in FIG. 10.

Since the baffle 72 shields the gas inlet of the outlet tube 1, though the baffle 72 is arranged to be inclined in a certain angle with the inlet plane of the outlet tube 1, it may still affect the discharge of the gas in a certain degree. For allowing the separated gas to enter into the outlet tube 2 smoothly under the action of an external force, the gas inlet end of the outlet tube 2 may be arranged to be an inclined plane facing the flange 71. In this way, the bottom plate 73 is fixedly connected to the outer wall at a higher portion of the gas inlet end of the outlet tube 2. The angle between the plane of the gas inlet of the outlet tube 2 and the baffle 72 increases, which facilitates the gas entering into the outlet tube 2.

In the case that the gas inlet end of the outlet tube 2 is arranged to be an inclined plane, the vane 74 must be ensured to shield the inclined side wall of the gas inlet end of the outlet tube 2 in the arrangement, so as to prevent the liquid rebounded by the inner wall of the cylindrical body 5 from falling into the outlet tube 2.

Further, in the case that the gas inlet end of the outlet tube 2 is arranged to be an inclined plane, the side, fixedly connected to the bottom plate 73, of the gas inlet end of the outlet tube 2 may be arranged to be a connecting surface 211 (shown in FIG. 9). The bottom plate 73 may be connected to the connecting surface 211 of the gas inlet end of the outlet tube 2 by spot welding (shown in FIG. 11), to make the fixing between the gas guide element 7 and the outlet tube 2 more reliable.

For the reliable fixing of the outlet tube 2, an annular-shaped step 212 may be further arranged on an outer wall of a lower portion of the outlet tube 2. Specifically, the annular-shaped step 212 is located at the connecting portion of the lower end cover 4 and the outlet tube 2. An entire lower annular-shaped surface of the annular-shaped step 212 is fixedly connected to the inner wall of the lower end cover 4. In this way, the fixing area for fixing the outlet tube 2 may be increased to strengthen the fixing of the outlet tube 2. It is to be noted that the lower annular-shaped surface of the annular-shaped step 211 means a step surface of the annular-shaped step 211 facing downwards when the annular-shaped step 211 is kept vertical.

For facilitating the assembly, the outlet tube 2 may be divided into two parts in the manufacture, that is, a first straight tube 21 located inside the inner chamber of the cylindrical body 5 and a second straight tube 22 located outside the lower end of the cylindrical body 5. A lower end of the first straight tube 21 and an upper end of the second straight tube 22 are fixedly connected to the lower end cover 4. Other specific structural arrangements are the same as those of the above outlet tube 2 integrally manufactured, and the detail description thereof will be omitted.

It is to be noted that, the fixed connection manner described hereinbefore may all be achieved by welding. Braze welding and argon arc welding may be chosen, and other welding method may also be adopted. Another fixed connection manners may also be chose.

Furthermore, the gas-liquid separator may further include a filter component 6. The filter component 6 further includes a filter seat and a filter screen connected to the filter seat. A through hole is provided at a side wall of the outlet tube 2 at a lower portion of the inner chamber of the cylindrical body 5. The filter seat is fixedly connected to the through hole 213 (as shown in FIG. 6). In this way, a small amount of liquid inside the inner chamber of the cylindrical body 5 may be exported to the outlet tube 2 via the filter component 6.

A gas-liquid separator according to the present application is described in detail hereinbefore. The principle and the embodiments of the present application are illustrated herein by specific examples. The above description of examples is only intended to help the understanding of the concept of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. A gas-liquid separator, comprising a cylindrical body, an inlet tube fixedly connected to an upper end of the cylindrical body, and an outlet tube fixedly connected to a lower end of the cylindrical body, wherein
    the gas-liquid separator further comprises a gas guide element, the gas guide element comprises a baffle, a flange located at an end of the baffle, and a bottom plate located at the other end of the baffle, the baffle is located above the outlet tube and adapted to shield a gas inlet of the outlet tube; the flange is fixedly connected to an inner wall of the cylindrical body; and the bottom plate is fixedly connected to a side wall of a gas inlet end of the outlet tube; and
    the gas-liquid separator further comprises a filter component, the filter component including a filter seat and a filter screen, a through hole is provided at a side wall of a lower portion of the outlet tube, and the filter component is fixedly connected to the through hole.

2. The gas-liquid separator according to claim 1, wherein the gas guide element further comprises vanes connected to both sides of the bottom plate respectively, and the vanes abut against the side wall of the gas inlet end of the outlet tube.

3. The gas-liquid separator according to claim 1, wherein the baffle is in a hemicycle shape, and the flange is located on an upper side of the baffle at a circular-arc end of the baffle, and the bottom plate is located on a lower side of the baffle at a straight line end of the baffle.

4. The gas-liquid separator according to claim 1, wherein the baffle is arranged to be inclined.

5. The gas-liquid separator according to claim 4, wherein the gas inlet end of the outlet tube is arranged to be an inclined plane facing the flange.

6. The gas-liquid separator according to claim 1, wherein a connecting surface is arranged at the side wall of the gas inlet end of the outlet tube, and the bottom plate is fixedly connected to the connecting surface by spot welding.

7. The gas-liquid separator according to claim 1, wherein an annular-shaped step is provided at an outer wall of a lower portion of the outlet tube, and an annular-shaped surface of the annular-shaped step is fixedly connected to the cylindrical body.

8. The gas-liquid separator according to claim 1, wherein the outlet tube comprises a first straight tube located inside an inner chamber of the cylindrical body, and a second straight tube located outside the lower end of the cylindrical body, and both the first straight tube and the second straight tube are fixedly connected to the cylindrical body.

9. The gas-liquid separator according to claim 1, wherein the cylindrical body further comprises an upper end cover, a lower end cover and an intermediate body fixedly connected to the upper end cover and the lower end cover, the inlet tube is fixedly connected to the upper end cover, the outlet tube is fixedly connected to the lower end cover, and the flange of the gas guide element is fixedly connected to an inner wall of the intermediate body.

* * * * *